(12) United States Patent
Ishino (10) Patent No.: US 11,505,005 B2
(45) Date of Patent: Nov. 22, 2022

(54) PNEUMATIC TIRE

(71) Applicant: Sumitomo Rubber Industries, Ltd., Kobe (JP)

(72) Inventor: Hiroyuki Ishino, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 828 days.

(21) Appl. No.: 15/719,009

(22) Filed: Sep. 28, 2017

(65) Prior Publication Data

US 2018/0093534 A1    Apr. 5, 2018

(30) Foreign Application Priority Data

Sep. 30, 2016  (JP) .............................. JP2016-193706

(51) Int. Cl.
*B60C 11/11*    (2006.01)
*B60C 11/03*    (2006.01)
*B60C 11/12*    (2006.01)

(52) U.S. Cl.
CPC ...... *B60C 11/0302* (2013.01); *B60C 11/1204* (2013.01); *B60C 11/1236* (2013.01); *B60C 2011/0374* (2013.01); *B60C 2011/0381* (2013.01); *B60C 2011/1213* (2013.01)

(58) Field of Classification Search
CPC ............. B60C 11/0327; B60C 11/0302; B60C 11/1236; B60C 2011/0381; B60C 2011/0374
See application file for complete search history.

(56) References Cited

U.S. PATENT DOCUMENTS

| 5,725,700 | A | * | 3/1998 | Ichiki | .................. B60C 11/0302 |
| | | | | | 152/209.18 |
| D830,288 | S | * | 10/2018 | Uchida | ........................ D12/567 |
| 2002/0139462 | A1 | * | 10/2002 | Hanebuth | ........... B60C 11/0302 |
| | | | | | 152/209.15 |
| 2011/0067794 | A1 | * | 3/2011 | Endou | ................. B60C 11/0302 |
| | | | | | 152/209.18 |
| 2015/0231930 | A1 | * | 8/2015 | Kurosawa | ........... B60C 11/1204 |
| | | | | | 152/209.25 |
| 2016/0243899 | A1 | * | 8/2016 | Miyoshi | .................. B60C 11/12 |
| 2017/0001477 | A1 | * | 1/2017 | Montesello | ......... B60C 11/0304 |

FOREIGN PATENT DOCUMENTS

JP    2006-298202 A    11/2006

* cited by examiner

*Primary Examiner* — Steven D Maki
(74) *Attorney, Agent, or Firm* — Birch, Stewart, Kolasch & Birch, LLP (57) ABSTRACT

A first and a second tread pattern portions P1 and P2 on each side of a tire equator (Co) are line symmetry except being circumferentially misaligned, and are each provided with oblique lateral grooves 3, inner and outer joint grooves 4 and 5 connecting between the circumferentially adjacent oblique lateral grooves 3, inner terminating grooves 7 disposed between the inner and outer joint grooves 4 and 5, outer terminating grooves 8 disposed between the outer joint grooves and a ground contact edge (TE), and center joint grooves 6 alternately connecting the oblique lateral grooves of the first and second tread pattern portions. The inner and outer joint grooves 4 and 5 and the inner and outer terminating grooves 7 and 8 are inclined to different directions from the oblique lateral grooves 3. The outer terminating grooves 8 extend on extended lines of the outer joint grooves 5.

17 Claims, 3 Drawing Sheets

PNEUMATIC TIRE

TECHNICAL FIELD

The present invention relates to a pneumatic tire which can be suitably used as an all season tire and can achieve steering stability both on a dry road surface and a snowy road surface at a high level.

BACKGROUND ART

In a pneumatic tire having improved on-snow performance, a block pattern in which a tread portion is divided into a plurality of blocks by circumferential grooves extending continuously in a tire circumferential direction and lateral grooves extending in a tire axial direction is widely used (for example, Japanese Unexamined Patent Application Publication No. 2006-298202). In this pattern, grip force in the tire circumferential direction is obtained by shearing snow blocks compressed in the lateral grooves, therefore, driving performance and braking performance on a snowy road are exerted. Further, lateral grip force is obtained by shearing snow blocks compressed in the circumferential grooves, therefore, the steering stability (straight running stability and cornering performance) on a snowy road is exerted.

However, in a case of the above block pattern, force received from a road surface during driving and braking is exerted mainly in width directions of snow blocks in the lateral grooves, and hardly on snow blocks in the circumferential grooves. On the contrary, force received from the road surface during cornering is exerted mainly in width directions of the snow blocks in the circumferential grooves, and hardly on the snow blocks in the lateral grooves. That is, the snow blocks in the circumferential grooves and the lateral grooves tend to function independently, therefore, the snow blocks are likely to be broken. Thereby, shear force as a whole of the snow blocks is decreased, therefore, it is possible that on-snow performance is not fully exerted.

SUMMARY OF THE INVENTION

The present invention was made in view of the above, and a primary object thereof is to provide a pneumatic tire capable of achieving steering stability both on a dry road surface and a snowy road surface at a high level.

In one aspect of the present invention, a pneumatic tire comprises a tread portion comprising a first tread pattern portion provided on a first side of a tire equator in a tire axial direction and a second tread pattern portion provided on a second side of the tire equator in the tire axial direction, the first tread pattern portion and the second tread pattern portion being arranged line symmetrically with each other with respect to the tire equator except they are misaligned with each other in a tire circumferential direction, each of the first and the second tread pattern portions comprising, a plurality of oblique lateral grooves extending axially inwardly from a part of the pneumatic tire located on an axially outer side of a ground contact edge and obliquely to one side with respect to the tire circumferential direction and terminating without intersecting the tire equator to form inner ends thereof in a vicinity of the tire equator, a plurality of inner joint grooves each connecting on a side of the tire equator between the oblique lateral grooves adjacent with each other in the tire circumferential direction, a plurality of outer joint grooves each connecting on a side of the ground contact edge between the oblique lateral grooves adjacent with each other in the tire circumferential direction, a plurality of inner terminating grooves each disposed between one of the inner joint grooves and one of the outer joint grooves adjacent thereto, extending from one of the oblique lateral grooves toward its adjacent oblique lateral groove on the one side in the tire circumferential direction and terminating without intersecting the adjacent oblique lateral groove, a plurality of outer terminating grooves each disposed between one of the outer joint grooves and the ground contact edge adjacent thereto, extending from one of the oblique lateral grooves toward its adjacent oblique lateral groove on the one side in the tire circumferential direction and terminating without intersecting the adjacent oblique lateral groove, a plurality of center joint grooves extending across the tire equator to alternately connect the oblique lateral grooves of the first tread pattern portion and the oblique lateral grooves of the second tread pattern portion, each of the inner joint grooves, the outer joint grooves, the inner terminating grooves, and the outer terminating grooves are inclined to a different direction from the oblique lateral grooves, and the outer terminating grooves extending on extended lines of the outer joint grooves.

In another aspect of the invention, it is preferred that one of the inner joint grooves and one of the oblique lateral grooves intersect in a three-way junction shape, one of the inner terminating grooves and one of the oblique lateral grooves intersect in a three-way junction shape, and one of the outer terminating grooves extends on the extended line of one of the outer joint groove so that the one of the outer joint groove and the one of the oblique lateral grooves intersect in a crossroad shape.

In another aspect of the invention, it is preferred that an angle θac with respect to a tire axial direction line of a line segment AC extending between an intersection point A of one of the oblique lateral grooves of the first tread pattern portion and the ground contact edge of the first tread pattern portion and an intersection point C of the one of the oblique lateral grooves and one of the outer joint grooves connecting between the one of the oblique lateral grooves and its adjacent one of the oblique lateral grooves on the one side in the tire circumferential direction, an angle θce with respect to the tire axial direction line of a line segment CE extending between the intersection point C and an intersection point E of the one of the oblique lateral grooves and one of the center joint grooves connecting between the one of the oblique lateral grooves and another one of the oblique lateral grooves of the second tread pattern portion misaligned to the other side in the tire circumferential direction with respect to the one of the oblique lateral grooves, and an angle θeg with respect to the tire axial direction line of a line segment EG extending between the intersection point E and an intersection point G of the one of the oblique lateral grooves and one of the center joint grooves connecting between the one of the oblique lateral grooves and another one of the oblique lateral grooves of the second tread pattern portion misaligned to the one side in the tire circumferential direction satisfy following expressions:

$\theta ac < \theta ce < \theta eg$ 15 degrees $< \theta ac <$ 35 degrees 34 degrees $< \theta ce <$ 54 degrees 47 degrees $< \theta eg <$ 67 degrees.

In another aspect of the invention, it is preferred that a length Lac of the line segment AC in the tire axial direction, a length Lce of the line segment CE in the tire axial direction, a length Leh of a line segment EH extending between the intersection points E and H, and a ground contact half width TW which is a length in the tire axial direction between the tire equator and one of the ground contact edges satisfy following expressions:

$Lce < Leh < Lac$ $0.23 \times TW \leq Lac \leq 0.29 \times TW$ $0.14 \times TW \leq Lce \leq 0.20 \times TW$ $0.15 \times TW \leq Leh \leq 0.21 \times TW.$ In another aspect of the invention, it is preferred that the tread portion comprises a row of center blocks, the center blocks being surrounded by the oblique lateral grooves, the inner joint grooves, and the center joint grooves, rows of middle blocks, the middle blocks being surrounded by the oblique lateral grooves, the inner joint grooves, and the outer joint grooves, and rows of shoulder blocks, the shoulder blocks being surrounded by the oblique lateral grooves, the outer joint grooves, and the ground contact edges, the center blocks are provided with sipes extending substantially in the tire axial direction, the middle blocks are provided with sipes extending substantially parallel to the outer joint grooves, and the shoulder blocks are provided with sipes extending substantially perpendicularly to the outer joint grooves.

In another aspect of the invention, it is preferred that the tread portion comprises a tread rubber having rubber hardness in a range of from 45 to 70 degrees and a land ratio in a range of from 60% to 80%.

Note that the "tread edges" are defined as axially outermost ground contacting positions when the tire is in contact with a ground by being loaded with a standard tire load after mounted on a standard rim and inflated to a standard pressure.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO. The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO, however, in a case of a tire for passenger cars, it is 180 kPa. The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The "rubber hardness" is a type-A durometer hardness measured at a temperature of 23 degrees Celsius according to Japanese Industrial Standard JIS K6253.

The "land ratio" means a ratio (S/Sa) of surface area (S) of an entire land region between the tread edges and a virtual surface area (Sa) obtained by filling all the grooves in the land region between the tread edges.

DESCRIPTION OF THE PREFERRED EMBODIMENT

An embodiment of the present invention will now be described in detail.

Figure 1:
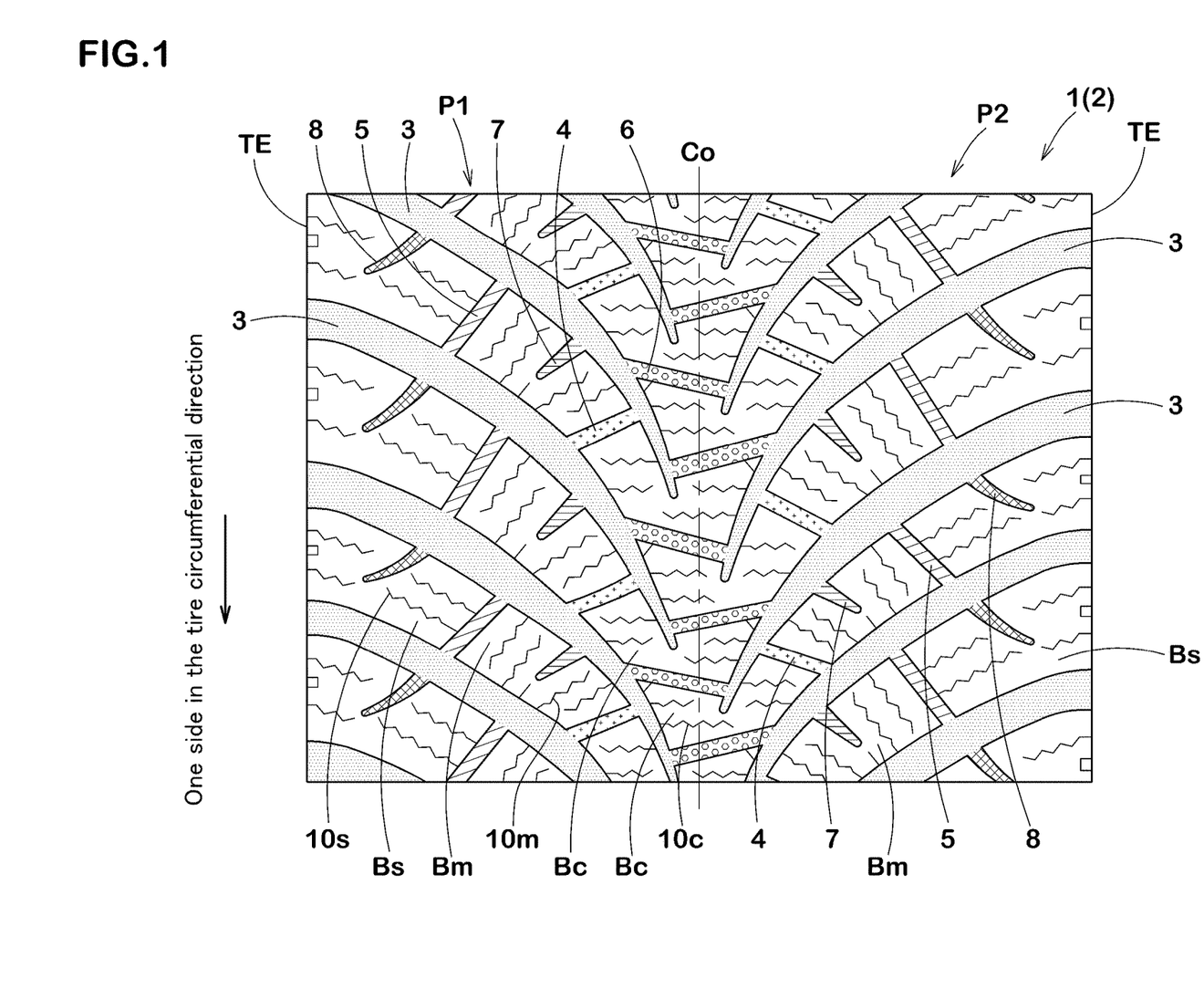
FIG. 1 is a development view illustrating a tread pattern of a pneumatic tire as an embodiment of the present invention.

As shown in FIG. 1, a pneumatic tire 1 in this embodiment is an all season tire, and a tread portion 2 thereof does not have a circumferential groove extending continuously in a tire circumferential direction. The circumferential groove includes a straight groove and a zigzag groove.

The tread portion 2 is provided with a first tread pattern portion P1 disposed on one side in a tire axial direction with respect to a tire equator (co) and a second tread pattern portion P2 disposed on the other side in the tire axial direction with respect to the tire equator (co). The first and second tread pattern portions P1 and P2 have line symmetrical patterns to each other except that the patterns are shifted from each other in the tire circumferential direction (that is, the phases are shifted in the tire circumferential direction).

Each of the first and second tread pattern portions P1 and P2 are provided with a plurality of oblique lateral grooves 3 arranged at intervals in the tire circumferential direction, inner joint grooves 4 connecting between the oblique lateral grooves 3 adjacent in the tire circumferential direction on a side of the tire equator (co), outer joint grooves 5 connecting between the oblique lateral grooves 3 adjacent in the tire circumferential direction on a side of a ground contact edge (TE), inner terminating grooves 7 each disposed between one of the inner joint grooves 4 and its adjacent one of the outer joint grooves 5, and outer terminating grooves 8 each disposed between one of the outer joint grooves 5 and the ground contact edge (TE).

Further, the tread portion 2 is provided with center joint grooves 6 extending across the tire equator (co) to alternately connect the oblique lateral grooves 3 of the first tread pattern portion P1 and the oblique lateral grooves 3 of the second tread pattern portion P2.

Thereby, the tread portion 2 is divided into a row of center blocks (Bc) which are surrounded by the oblique lateral grooves 3, the inner joint grooves 4, and the center joint grooves 6, a row of middle blocks (Bm) which are surrounded by the oblique lateral grooves 3, the inner joint grooves 4, and the outer joint grooves 5, and a row of shoulder blocks (Bs) which are surrounded by the oblique lateral grooves 3, the outer joint grooves 5, and the ground contact edges (TE).

Figure 2A:
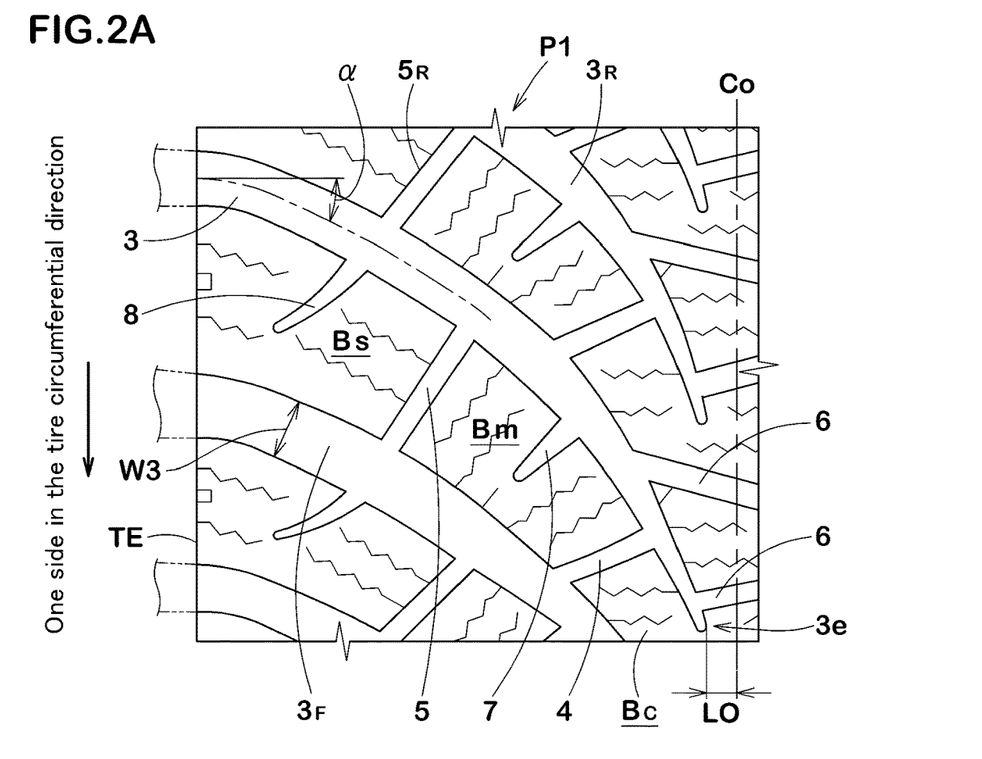
FIG. 2A is a partial development view representatively illustrating a part of the tread pattern on one side in the tire circumferential direction.

FIG. 2A representatively shows the first tread pattern portion P1. As shown in the figure, the oblique lateral grooves 3 extend axially inwardly and obliquely toward one side in the tire circumferential direction (toward a tire rolling direction in this embodiment) from a part of the pneumatic tire 1 located on an axially outer side of the ground contact edge TE to inner ends (3e) in the vicinity of the tire equator without crossing the tire equator (co).

The oblique lateral grooves 3 in this embodiment are formed as curved grooves in which the angles α thereof with respect to the tire axial direction gradually increase axially inwardly. The oblique lateral grooves 3 in this embodiment have groove widths W3 gradually decreasing axially inwardly. Thereby, strength of snow blocks in the oblique lateral grooves 3 increases axially outwardly, therefore, it is possible that cornering performance on a snowy road surface is effectively increased. Further, it is also helpful for improving snow discharging performance.

The "vicinity of the tire equator" means an area range in which a distance from the tire equator (co) is not greater than 5 mm. Therefore, a distance (Lo) between each of the inner ends (3e) and the tire equator (co) is set to be not greater than 5 mm.

Next, each of the inner terminating grooves 7 extends from respective one of the oblique lateral grooves 3 between the inner joint groove 4 and its adjacent outer joint groove 5 toward an oblique lateral groove 3F adjacent thereto on the one side in the tire circumferential direction. The inner terminating grooves 7 terminate without intersecting with the respective adjacent oblique lateral grooves 3F.

Next, each of the outer terminating grooves 8 extends from respective one of the oblique lateral grooves 3 between the outer joint groove 5 and its adjacent ground contact edge (TE) toward the oblique lateral groove 3F adjacent thereto on the one side in the tire circumferential direction. The outer terminating grooves 8 also terminate without intersecting with the respective adjacent oblique lateral grooves 3F.

Further, the outer terminating grooves 8 extend on extended lines of the outer joint grooves 5, respectively. More precisely, the outer terminating groove 8 extends on the extended line of the outer joint groove 5R connecting between the oblique lateral groove 3 and its adjacent oblique lateral groove 3R on the other side in the tire circumferential direction. Thereby, the outer joint groove 5R and the outer terminating groove 8 form one groove, and this groove and the oblique lateral groove 3 intersect in a crossroad shape. Note that the inner joint groove 4 and the oblique lateral groove 3 intersect in a three-way junction shape, and the inner terminating groove 7 and the oblique lateral groove 3 intersect in a three-way junction shape.

Each of the inner joint grooves 4, the outer joint grooves 5, the inner terminating grooves 7, and the outer terminating grooves 8 is inclined to a different direction from the oblique lateral grooves 3. Thereby, an intersection angle between the inner joint groove 4 and the oblique lateral groove 3, an intersection angle between the outer joint groove 5 and the oblique lateral groove 3, an intersection angle between the inner terminating groove 7 and the oblique lateral groove 3, and an intersection angle between the outer terminating groove 8 and the oblique lateral groove 3 can each be brought closer to a right angle. This helps to increase block rigidity of the middle blocks (Bm) and the shoulder blocks (Bs).

Figure 2B:
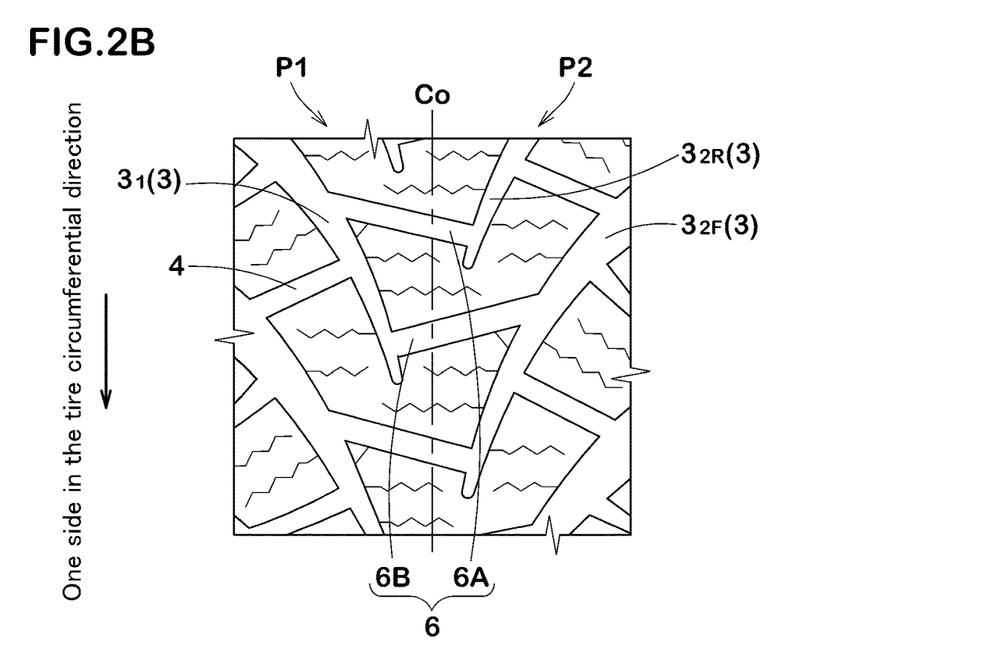
FIG. 2B is a partial development view illustrating center joint grooves.

Next, as shown in FIG. 2B, the center joint grooves 6 connect between the oblique lateral grooves 3 disposed in the first tread pattern portion P1 and the oblique lateral grooves 3 disposed in the second tread pattern portion P2 alternately in a zigzag manner. The center joint grooves 6 are disposed on an axially inner side of the inner joint grooves 4 and extend to cross the tire equator (Co). (For the sake of clarity, the oblique lateral grooves disposed in the first tread pattern portion P1 may be referred to as the oblique lateral grooves 31 and the oblique lateral grooves disposed in the second tread pattern portion P2 maybe referred to as the oblique lateral grooves 32.)

The center joint grooves 6 include first center joint grooves 6A and second center joint grooves 6B arranged alternately in the tire circumferential direction. The first center joint groove 6A connects between the oblique lateral groove 31 disposed in the first tread pattern portion P1 and the oblique lateral groove 32F disposed in the second tread pattern portion P2 so as to be misaligned to the one side in the tire circumferential direction with respect to the oblique lateral groove 31. The first center joint grooves 6A in this embodiment are inclined to a different direction from the oblique lateral grooves 31. Further, the second center joint groove 6B connects between the oblique lateral groove 31 disposed in the first tread pattern portion P1 and the oblique lateral groove 32R disposed in the second tread pattern portion P2 and misaligned to the other side in the tire circumferential direction with respect to the oblique lateral groove 31. The second center joint grooves 6B are inclined to the same direction as the oblique lateral grooves 31. That is, the first center joint grooves 6A and the second center joint grooves 6B are inclined to different directions from each other.

In the pneumatic tire 1 configured as such, the oblique lateral grooves 3, the inner and the outer joint grooves 4 and 5, and the inner and the outer terminating grooves 7 and 8 are inclined with respect to the tire axial direction, therefore, it is possible that snow blocks in the grooves 3, 4, 5, 7, and 8 exert snow shearing force both in the tire circumferential direction and in the tire axial direction. Therefore, it is possible that each snow block cooperate with each other to hold force received from a road surface during driving and braking and force received from a road surface during cornering. In addition, each force from a road surface exerts in a direction different from a width direction of each snow block, therefore, it is difficult for each snow block to break. Further, the inner and the outer joint grooves 4 and 5 are inclined, therefore, it is possible to make intersection positions of the inner and the outer joint grooves 4 and 5 with the oblique lateral grooves 3 dispersed in the tire axial direction as compared with a case of a circumferential groove, and thereby, it is possible that the snow blocks in each of the grooves 3, 4, and 5 are combined to form firm joined bodies. Further, each of the joined bodies is combined by snow blocks in the center joint grooves 6 to form firmer joined bodies. Furthermore, by cooperation of these effects, it is possible that shearing force is increased as a whole of the snow blocks and that on-snow performance, on-snow steering stability in particular, is improved.

Further, the tread portion 2 is provided with no circumferential grooves, and the inner and the outer joint grooves 4 and 5 are inclined to different directions from the oblique lateral grooves 3. Thereby, it is possible that each of the middle blocks (Bm) and the shoulder blocks (Bs) is brought close to a rectangular shape, and that lateral rigidity of the blocks is secured at a high level. Thereby, it is possible that the steering stability on a dry road surface is improved by increasing cornering power against a dry road surface. In particular, in order to make the shapes of the blocks (Bm) and (Bs) rectangular, it is preferred that angles of the inner joint grooves 4 with respect to the tire axial direction is set to be smaller than angles of the joint grooves 5 with respect to the tire axial direction in response to the angles α of the oblique lateral grooves 3 gradually increasing axially inwardly. Note that it is preferred that angles of the center joint grooves 6 with respect to the tire axial direction are even smaller than the angles of the inner joint grooves 4 for the purpose of the steering stability on a dry road surface. Note that the angles of the center joint grooves 6 with respect to the tire axial direction may be zero degrees.

Further, one ends of the inner terminating grooves 7 terminate within the middle blocks (Bm) and one ends of the outer terminating grooves 8 terminate within the shoulder blocks (Bs). Thereby, it is possible that the on-snow steering stability is further improved while maintaining high block rigidity by the above-described rectangular shapes of each of the blocks (Bm) and (Bs). Alternatively, it is also possible that the steering stability on a dry road surface is improved by reducing number and lengths of the sipes, for example, as much as the improvement of the on-snow steering stability. Note that it is preferred that angles of intersections between the inner joint grooves 4 and the oblique lateral grooves 3 and angles of intersections between the outer joint grooves 5 and the oblique lateral grooves 3 are in a range of 90±15 degrees.

For use as an all season tire, higher steering stability on a dry road surface than a winter tire is desired. Thereby, the tread portion 2 in this embodiment comprises a tread rubber having rubber hardness set to be in a range of from 45 to 70 degrees and a land ratio set to be in a range of from 60% to 80%. For the same purpose, groove depths (Ha) (not shown) of the oblique lateral grooves 3 and the center joint grooves 6 are set to be in a range of from 8.1 to 9.1 mm, and groove depths (Hb) (not shown) of the inner and the outer joint grooves 4 and 5, and the inner and the outer terminating grooves 7 and 8 are set to be not greater than the groove depths (Ha).

Figure 3:
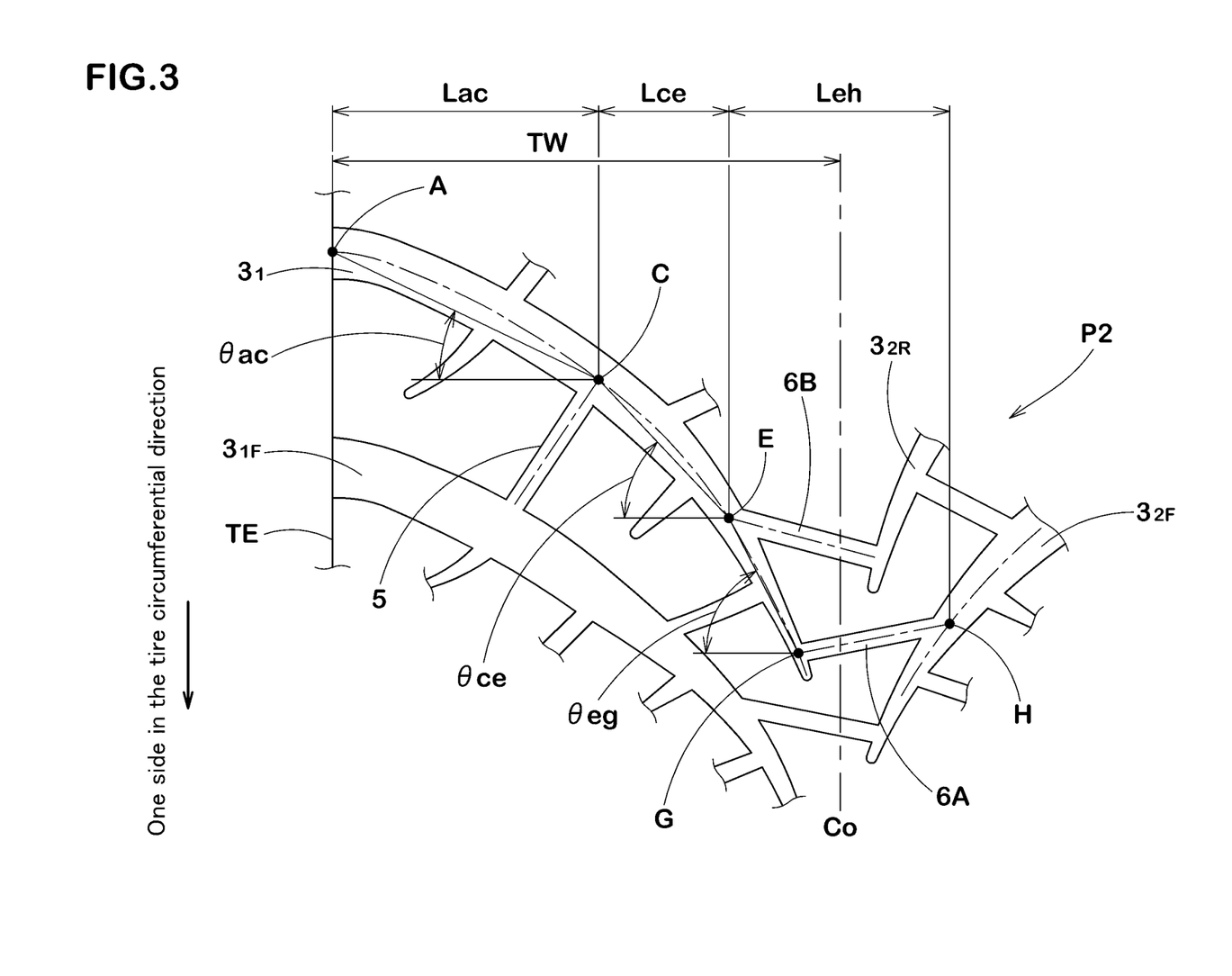
FIG. 3 is a partial development view illustrating intersections A, C, E, G, and H.

As shown in FIG. 3, in the pneumatic tire 1 in this embodiment, when intersection points A, C, E, G, and H are defined as follows, an angle $\theta ac$ of a line segment (AC) extending between the intersection points A and C with respect to a tire axial direction line, an angle $\theta ce$ of a line segment (CE) extending between the intersection points C and E with respect to the tire axial direction line and an angle $\theta eg$ of a line segment (EG) extending between the intersection points E and G with respect to the tire axial direction line satisfy following expressions:

$\theta ac < \theta ce < \theta eg$ 15 degrees $< \theta ac <$ 35 degrees 34 degrees $< \theta ce <$ 54 degrees 47 degrees $< \theta eg <$ 67 degrees.

For convenience's sake, an arbitrary one of the oblique lateral grooves in the first tread pattern portion P1 is referred to as the oblique lateral groove 31, another one of the oblique lateral grooves adjacent to the oblique lateral groove 31 on the one side in the tire circumferential direction is referred to as the oblique lateral groove 31F, yet another one of the oblique lateral grooves 31 in the second tread pattern portion P2 which is misaligned to the one side in the tire circumferential direction is referred to as the oblique lateral groove 32F, yet another one of the oblique lateral grooves in the second tread pattern portion P2 which is misaligned to the other side in the tire circumferential direction is referred to as the oblique lateral groove 32R, and the intersection points A, C, E, G, and H will be described below based on the above.

(A) The intersection point A is defined as an intersection point where the oblique lateral groove 31 intersects with the ground edge (TE).

(B) The intersection point C is defined as an intersection point where the outer joint groove 5 connecting between the oblique lateral groove 31 and the oblique lateral groove 31F intersects with the oblique lateral groove 31.

(C) The intersection point E is defined as an intersection point where the center joint groove 6B connecting between the oblique lateral groove 31 and the oblique lateral groove 32R intersects with the oblique lateral groove 31.

(D) The intersection point G is defined as an intersection point where the center joint groove 6A connecting between the oblique lateral groove 31 and the oblique lateral groove 32F intersects with the oblique lateral groove 31.

(E) The intersection point H is defined as an intersection point where the center joint groove 6A connecting between the oblique lateral groove 31 and the oblique lateral groove 32F intersects with the oblique lateral groove 32F.

Strictly speaking, the intersection points A, C, E, G, and H are defined as intersection points of groove width center lines of the respective grooves 31, 5, 6, and 32F.

Further, in the pneumatic tire 1 in this embodiment, a length (Lac) of the line segment (AC) in the tire axial direction, a length (Lce) of the line segment (CE) in the tire axial direction, a length (Leh) of a line segment (EH) extending between the intersection points E and H, and a ground contact half width (TW) which is a length in the tire axial direction between the tire equator (Co) and one of the ground contact edges (TE) satisfy following expressions:

$Lce < Leh < Lac$ $0.23 \times TW \leq Lac \leq 0.29 \times TW$ $0.14 \times TW \leq Lce \leq 0.20 \times TW$ $0.15 \times TW \leq Leh \leq 0.21 \times TW.$ Owing to the angles $\theta ac$, $\theta ce$, and $\theta eg$ satisfying the above expressions, it is possible that the steering stability on a dry road surface and the on-snow steering stability are improved in a good balance. Note that if the angles $\theta ac$, $\theta ce$, and $\theta eg$ are smaller than the above range, lateral grip force by snow blocks decreases, therefore, the on-snow steering stability tends to deteriorate. Conversely, if the angles $\theta ac$, $\theta ce$, and $\theta eg$ are larger than the above range, the lateral rigidity of the snow blocks decreases, therefore, the steering stability on a dry road surface tends to deteriorate. In particular, if the angle $\theta ac$ is too large, ground contact of a rear tire during steering tends to deteriorate on a dry road surface. Further, if the angle $\theta ce$ and the angle $\theta eg$ are too large, the responsiveness of a front tire tends to deteriorate.

Similarly, owing to the lengths (Lce), (Leh), and (Lac) satisfying the above expressions, it is possible that the steering stability on a dry road surface and the on-snow steering stability are improved in a good balance. Note that if the lengths (Lce), (Leh), and (Lac) are larger than the above range, the lateral grip force by the snow blocks decreases, therefore, the on-snow steering stability tends to deteriorate. Conversely, if the lengths (Lce), (Leh), and (Lac) are smaller than the above range, the lateral rigidity of the snow blocks decreases, therefore, the steering stability on a dry road surface tends to deteriorate. In particular, if the length (Lac) is too small, the ground contact of a rear tire during steering on a dry road surface tends to deteriorate, and if the length (Lce) is too small, the responsiveness of a front tire tends to deteriorate. Further, if the length (Leh) is too small, edge components in a lateral direction become too small, therefore, the on-snow steering stability tends to deteriorate.

As shown in FIG. 1, in the pneumatic tire 1 in this embodiment, the center blocks (Bc) are provided with sipes 10c extending substantially in the tire axial direction. The middle blocks (Bm) are provided with sipes 10m extending substantially in parallel with the outer joint grooves 5. The shoulder blocks (Bs) are provided with sipes 10s extending substantially perpendicularly to the outer joint grooves 5.

The sipes 10m of the middle blocks (Bm) extend substantially in parallel with the outer joint grooves 5, therefore, it is possible that the block rigidity is maintained at a higher level, which can contribute to the steering stability on a dry road surface. The sipes 10s of the shoulder blocks (Bs) extend substantially perpendicularly to the outer joint grooves 5, therefore, it is possible that more of longer sipes are formed and that driving performance and braking performance on a snowy road are improved. Further, the sipes 10c of the center blocks (Bc) extend substantially in the tire axial direction, therefore, the sipes 10c are formed to extend in different angles from those of the sipes 10m and 10s. Thereby, it is possible that edge effects on multiple directions are ensured and that the on-snow steering stability is improved.

Note that "the sipes 10c extend substantially in the tire axial direction" means that length directions of the sipes 10c and the tire axial direction are parallel or angles therebetween are not greater than 10 degrees. Further, "the sipes 10m extend substantially in parallel with the outer joint grooves 5" means that length directions of the sipes 10m are parallel to groove centers of the outer joint grooves 5, or angles therebetween are not greater than 10 degrees. Furthermore, "the sipes 10s extend substantially perpendicularly to the outer joint grooves 5" means that angles between the length directions of the sipes 10m and the groove centers of the outer joint grooves 5 are in a range of from 80 to 100 degrees. Note that it is preferred that at least one end of each sipes 10c, 10m, and 10s terminates within the block for the steering stability on a dry road surface.

While detailed description has been made of the tire as an especially preferred embodiment of the present invention, the present invention can be embodied in various forms without being limited to the illustrated embodiment.

Working Example (Example)

All season tires of size 205/55R16 having the basic tread pattern shown in FIG. 1 were made by way of test according to the specifications listed in Table 1, and then each of the test tires was tested for the on-snow steering stability and the steering stability on a dry road surface. As references, tires having inner and outer circumferential grooves extending straight in the tire circumferential direction instead of the inner and the outer joint grooves 4 and 5 were used. Note that groove widths of the circumferential grooves are substantially the same as those of the inner and the outer joint grooves 4 and 5.

Each of the test tires has substantially the same configuration except as shown in Table 1. Note that the common specifications are as follows.
Land ratio: 70%
Ground contacting width: 160 mm
Hardness of tread rubber measured by a type-A durometer: 65 degrees
Groove depth of each groove: 8.6 mm
<On-Snow Steering Stability>
The test tires were mounted on rims (16×6.5) of all wheels of a Volkswagen GOLF 7.0 (displacement of 2000 cc) under the conditions of tire pressure of 200 kPa (front wheels) and 200 kPa (rear wheels). Then, the steering stability during running on a test course covered with snow was evaluated by the driver's feeling by a ten point method, wherein the larger the numerical value, the better the steering stability.
<Steering Stability on a Dry Road Surface>
Using the above-mentioned vehicle, the steering stability during running on a dry test course was evaluated by the driver's feeling by the ten point method, wherein the larger the numerical value, the better the steering stability.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ref. 2 |
| --- | --- | --- | --- | --- | --- | --- | --- | --- | --- | --- | --- | --- | --- |
| Circumferential grooves | presence |  |  |  |  |  | absence |  |  |  |  |  |  |
| Inner joint grooves | absence |  |  |  |  |  | presence |  |  |  |  |  |  |
| Outer joint grooves | absence |  |  |  |  |  | presence |  |  |  |  |  |  |
| Center joint grooves | presence |  |  |  |  |  | presence |  |  |  |  |  |  |
| Inner terminating grooves | presence |  |  |  |  |  | presence |  |  |  |  |  | absence |
| Outer terminating grooves | presence |  |  |  |  |  | presence |  |  |  |  |  | absence |
| Oblique lateral grooves |  |  |  |  |  |  | presence |  |  |  |  |  |  |
| Angles θac [degree] | 25 | 25 | 16 | 34 | 16 | 10 | 40 | 25 | 25 | 25 | 25 | 25 | 25 |
| Angles θce [degree] | 44 | 44 | 35 | 53 | 53 | 29 | 59 | 44 | 44 | 44 | 44 | 44 | 44 |
| Angles θeg [degree] | 57 | 57 | 48 | 66 | 66 | 42 | 72 | 57 | 57 | 57 | 57 | 57 | 57 |
| Length (Lac) *1 | 0.26 | 0.26 | 0.26 | 0.26 | 0.26 | 0.26 | 0.26 | 0.24 | 0.28 | 0.29 | 0.23 | 0.26 | 0.26 |
| Length (Lce) *1 | 0.17 | 0.17 | 0.17 | 0.17 | 0.17 | 0.17 | 0.17 | 0.19 | 0.15 | 0.17 | 0.2 | 0.14 | 0.17 |

TABLE 1-continued

|  | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ref. 2 |
|---|---|---|---|---|---|---|---|---|---|---|---|---|---|
| Length (Leh) *1 | 0.18 | 0.18 | 0.18 | 0.18 | 0.18 | 0.18 | 0.18 | 0.18 | 0.18 | 0.15 | 0.18 | 0.21 | 0.18 |
| Steering stability on a dry road surface | 7 | 10 | 10 | 8 | 9 | 10 | 7 | 9 | 9 | 8 | 8 | 8 | 10 |
| On-snow steering stability | 7 | 10 | 8 | 10 | 10 | 7 | 10 | 8 | 8 | 8 | 8 | 8 | 8 |
| (Total) | 14 | 20 | 18 | 18 | 19 | 17 | 17 | 17 | 17 | 16 | 16 | 16 | 18 |

*1: shown as a ratio to ground contact half width TW (/TW)

As shown in the table, it can be confirmed that the tires as the examples can increase the potential of the total of the steering stability on a dry road surface and the on-snow steering stability and that both can be achieved at a high level.

The invention claimed is:

1. A pneumatic tire comprising:
a tread portion comprising a first tread pattern portion provided on a first side of a tire equator in a tire axial direction and a second tread pattern portion provided on a second side of the tire equator in the tire axial direction, the first tread pattern portion and the second tread pattern portion being arranged line symmetrically with each other with respect to the tire equator except they are misaligned with each other in a tire circumferential direction;
each of the first and the second tread pattern portions comprising:
a plurality of oblique lateral grooves extending axially inwardly from a part of the pneumatic tire located on an axially outer side of a ground contact edge and being inclined obliquely in a first direction with respect to the tire circumferential direction and terminating without intersecting the tire equator to form inner ends thereof in a vicinity of the tire equator, the inner ends being closed ends to which no other grooves are connected;
a plurality of inner joint grooves each connecting on the tire equator side between the oblique lateral grooves adjacent with each other in the tire circumferential direction;
a plurality of outer joint grooves each connecting on the ground contact edge side between the oblique lateral grooves adjacent with each other in the tire circumferential direction;
a plurality of inner terminating grooves each disposed between one of the inner joint grooves and one of the outer joint grooves adjacent thereto, extending from one of the oblique lateral grooves toward its adjacent oblique lateral groove on a first side in the tire circumferential direction and terminating without intersecting the adjacent oblique lateral groove;
a plurality of outer terminating grooves each disposed between one of the outer joint grooves and the ground contact edge adjacent thereto, extending from one of the oblique lateral grooves toward its adjacent oblique lateral groove on the first side in the tire circumferential direction and terminating without intersecting the adjacent oblique lateral groove;
a plurality of center joint grooves extending across the tire equator to connect the oblique lateral grooves of the first tread pattern portion and the oblique lateral grooves of the second tread pattern portion;
each of the inner joint grooves, the outer joint grooves, the inner terminating grooves, and the outer terminating grooves are inclined in a second direction which is opposite to the first direction with respect to the tire circumferential direction; and
the outer terminating grooves extending on extended lines of the outer joint grooves, wherein
the tread portion does not have any circumferential straight groove extending continuously in the tire circumferential direction,
one of the inner joint grooves and one of the oblique lateral grooves intersect in a three-way junction shape,
one of the inner terminating grooves and one of the oblique lateral grooves intersect in a three-way junction shape,
one of the outer terminating grooves extends on the extended line of one of the outer joint grooves which is drawn straight in a groove longitudinal direction thereof so that the one of the outer joint grooves, the one of the outer terminating grooves and the one of the oblique lateral grooves intersect with one another,
the plurality of center joint grooves has a groove depth (Ha), and
the plurality of inner joint grooves, the plurality of outer joint grooves, the plurality of inner terminating grooves, and the plurality of outer terminating grooves have groove depths (Hb) that are not greater than the groove depth (Ha).

2. The pneumatic tire according to claim 1, wherein
an angle θac with respect to a tire axial direction line of a line segment AC extending between an intersection point A of one of the oblique lateral grooves of the first tread pattern portion and the ground contact edge of the first tread pattern portion and an intersection point C of the one of the oblique lateral grooves and one of the outer joint grooves connecting between the one of the oblique lateral grooves and its adjacent one of the oblique lateral grooves on the first side in the tire circumferential direction,
an angle θce with respect to the tire axial direction line of a line segment CE extending between the intersection point C and an intersection point E of the one of the oblique lateral grooves and one of the center joint grooves connecting between the one of the oblique lateral grooves and another one of the oblique lateral grooves of the second tread pattern portion misaligned to a second side, opposite to the first side, in the tire circumferential direction with respect to the one of the oblique lateral grooves, and
an angle θeg with respect to the tire axial direction line of a line segment EG extending between the intersection point E and an intersection point G of the one of the oblique lateral grooves and one of the center joint grooves connecting between the one of the oblique lateral grooves and another one of the oblique lateral grooves of the second tread pattern portion misaligned to the first side in the tire circumferential direction satisfy following expressions:

$\theta ac < \theta ce < \theta eg$ 15 degrees $< \theta ac <$ 35 degrees 34 degrees $< \theta ce <$ 54 degrees 47 degrees $< \theta eg <$ 67 degrees.

3. The pneumatic tire according to claim 2, wherein a length Lac of the line segment AC in the tire axial direction, a length Lce of the line segment CE in the tire axial direction, a length Leh of a line segment EH extending between the intersection point E and an intersection point H of the one of the center joint grooves to said another one of the oblique lateral grooves, and a ground contact half width TW which is a length in the tire axial direction between the tire equator and one of the ground contact edges satisfy following expressions:

$Lce < Leh < Lac$ $0.23 \times TW \le Lac \le 0.29 \times TW$ $0.14 \times TW \le Lce \le 0.20 \times TW$ $0.15 \times TW \le Leh \le 0.21 \times TW.$ 4. The pneumatic tire according to claim 1, wherein
the tread portion comprises a row of center blocks, the center blocks being surrounded by the oblique lateral grooves, the inner joint grooves, and the center joint grooves, rows of middle blocks, the middle blocks being surrounded by the oblique lateral grooves, the inner joint grooves, and the outer joint grooves, and rows of shoulder blocks, the shoulder blocks being surrounded by the oblique lateral grooves, the outer joint grooves, and the ground contact edges,
the center blocks are provided with sipes extending substantially in the tire axial direction,
the middle blocks are provided with sipes extending substantially parallel to the outer joint grooves, and
the shoulder blocks are provided with sipes extending substantially perpendicularly to the outer joint grooves.

5. The pneumatic tire according to claim 1, wherein the tread portion comprises a tread rubber having durometer type-A hardness in a range of from 45 to 70 degrees and a land ratio in a range of from 60% to 80%.

6. The pneumatic tire according to claim 1, wherein one of the inner joint grooves and one of the oblique lateral grooves intersect at a location to which no other grooves are connected, thereby forming a three-way groove junction shape.

7. The pneumatic tire according to claim 1, wherein one of the inner terminating grooves and one of the oblique lateral grooves intersect at a location to which no other grooves are connected, thereby forming a three-way groove junction shape.

8. The pneumatic tire according to claim 1, wherein the plurality of center joint grooves extends straight over its entire length.

9. The pneumatic tire according to claim 1, wherein an angle of the plurality of inner joint grooves with respect to the tire axial direction is smaller than an angle of the plurality of outer joint grooves with respect to the tire axial direction.

10. The pneumatic tire according to claim 9, wherein an angle of the plurality of center joint grooves with respect to the tire axial direction is smaller than the angle of the plurality of inner joint grooves.

11. The pneumatic tire according to claim 1, wherein an angle of the plurality of center joint grooves with respect to the tire axial direction is smaller than an angle of the plurality of inner joint grooves.

12. The pneumatic tire according to claim 1, wherein angles of intersections between the plurality of inner joint grooves and the plurality of oblique lateral grooves and angles of intersections between the plurality of outer joint grooves and the plura of oblique lateral grooves are in a range of 90±15 degrees.

13. The pneumatic tire according to claim 1, wherein
the plurality of oblique lateral grooves has a groove depth (Ha), and
groove depths (Hb) of the plurality of inner joint grooves, the plurality of outer joint grooves, the plurality of inner terminating grooves, and the plurality of outer terminating grooves are not greater than the groove depth (Ha).

14. The pneumatic tire according to claim 1, wherein the groove depth (Ha) is in a range from 8.1 to 9.1 mm.

15. The pneumatic tire according to claim 1, wherein
the tread portion comprises a row of center blocks, the center blocks being surrounded by the oblique lateral grooves, the inner joint grooves, and the center joint grooves, rows of middle blocks, the middle blocks being surrounded by the oblique lateral grooves, the inner joint grooves, and the outer joint grooves, and rows of shoulder blocks, the shoulder blocks being surrounded by the oblique lateral grooves, the outer joint grooves, and the ground contact edges,
the center blocks are provided with sipes extending substantially in the tire axial direction,
the middle blocks are provided with sipes having a sipe longitudinal direction that is parallel to a longitudinal direction of the outer joint grooves, or is inclined at an angle of 10 degrees or less with respect to the longitudinal direction of the outer joint grooves, and
the shoulder blocks are provided with sipes extending substantially perpendicularly to the outer joint grooves.

16. A pneumatic tire comprising
a tread portion comprising a first tread pattern portion provided on a first side of a tire equator in a tire axial direction and a second tread pattern portion provided on a second side of the tire equator in the tire axial direction, the first tread pattern portion and the second tread pattern portion being arranged line symmetrically with each other with respect to the tire equator except they are misaligned with each other in a tire circumferential direction;
each of the first and the second tread pattern portions comprising:
a plurality of oblique lateral grooves extending axially inwardly from a part of the pneumatic tire located on an axially outer side of a ground contact edge and being inclined obliquely in a first direction with respect to the tire circumferential direction and terminating without intersecting the tire equator to form inner ends thereof in a vicinity of the tire equator, the inner ends being closed ends to which no other grooves are connected;
a plurality of inner joint grooves each connecting on the tire equator side between the oblique lateral grooves adjacent with each other in the tire circumferential direction;

a plurality of outer joint grooves each connecting on the ground contact edge side between the oblique lateral grooves adjacent with each other in the tire circumferential direction;

a plurality of inner terminating grooves each disposed between one of the inner joint grooves and one of the outer joint grooves adjacent thereto, extending from one of the oblique lateral grooves toward its adjacent oblique lateral groove on a first side in the tire circumferential direction and terminating without intersecting the adjacent oblique lateral groove;

a plurality of outer terminating grooves each disposed between one of the outer joint grooves and the ground contact edge adjacent thereto, extending from one of the oblique lateral grooves toward its adjacent oblique lateral groove on the first side in the tire circumferential direction and terminating without intersecting the adjacent oblique lateral groove;

a plurality of center joint grooves extending across the tire equator to connect the oblique lateral grooves of the first tread pattern portion and the oblique lateral grooves of the second tread pattern portion, the plurality of center joint grooves comprises first center joint grooves and second center joint grooves arranged alternately in the tire circumferential direction, the first center joint grooves and the second center joint grooves are inclined to different directions from each other, the first center joint grooves are inclined to a same direction as the oblique lateral grooves disposed in the first tread pattern portion with respect to the tire circumferential direction, and are inclined to a different direction from the oblique lateral grooves disposed in the second tread pattern portion with respect to the tire circumferential direction, the second center joint grooves are inclined to a same direction as the oblique lateral grooves disposed in the second tread pattern portion with respect to the tire circumferential direction, and are inclined to a different direction from the oblique lateral grooves disposed in the first tread pattern portion with respect to the tire circumferential direction;

each of the inner joint grooves, the outer joint grooves, the inner terminating grooves, and the outer terminating grooves are inclined in a second direction which is opposite to the first direction with respect to the tire circumferential direction;

the outer terminating grooves extend on extended lines of the outer joint grooves, the tread portion does not have any circumferential straight groove extending continuously in the tire circumferential direction, one of the inner joint grooves and one of the oblique lateral grooves intersect in a three-way junction shape, one of the inner terminating grooves and one of the oblique lateral grooves intersect in a three-way junction shape, and one of the outer terminating grooves extends on the extended line of one of the outer joint grooves which is drawn straight in a groove longitudinal direction thereof so that, the one of the outer joint grooves, the one of the outer terminating grooves and the one of the oblique lateral grooves intersect with one another.

17. The pneumatic tire according to claim 16, wherein the tread portion comprises a row of center blocks, the center blocks being surrounded by the oblique lateral grooves, the inner joint grooves, and the center joint grooves, rows of middle blocks, the middle blocks being surrounded by the oblique lateral grooves, the inner joint grooves, and the outer joint grooves, and rows of shoulder blocks, the shoulder blocks being surrounded by the oblique lateral grooves, the outer joint grooves, and the ground contact edges, the center blocks are provided with sipes extending substantially in the tire axial direction, the middle blocks are provided with sipes having a sipe longitudinal direction that is parallel to a longitudinal direction of the outer joint grooves, or is inclined at an angle of 10 degrees or less with respect to the longitudinal direction of the outer joint grooves, and the shoulder blocks are provided with sipes extending substantially perpendicularly to the outer joint grooves.

* * * * *